United States Patent [19]

Ozasa

[11] 4,399,177

[45] Aug. 16, 1983

[54] SUPPORTING STRUCTURE FOR DECALCOMANIA

[75] Inventor: Tetsuya Ozasa, Kawasaki, Japan

[73] Assignee: Tokyo Tokushu Insatsu Kogyo Kabushiki Kaisha, Japan

[21] Appl. No.: 297,163

[22] Filed: Aug. 28, 1981

[51] Int. Cl.[3] .......................... B32B 23/06; C09J 7/02

[52] U.S. Cl. .................................... 428/199; 156/230; 156/240; 427/149; 427/150; 428/201; 428/202; 428/203; 428/204; 428/207; 428/211; 428/343; 428/350; 428/354; 428/913; 428/914

[58] Field of Search ............... 428/211, 914, 201, 202, 428/199, 203, 204, 207, 343, 350, 354, 913; 427/147, 149, 150; 156/230, 234, 240; 346/135.1

[56] References Cited

U.S. PATENT DOCUMENTS

| | | | |
|---|---|---|---|
| 2,216,289 | 10/1940 | Asnes | 428/211 X |
| 2,250,197 | 7/1941 | Humphner | 428/211 X |
| 2,629,679 | 2/1953 | Rathke | 428/914 |
| 2,758,035 | 8/1956 | Matthes | 428/211 X |
| 3,274,017 | 9/1966 | Borrajo | 428/914 |
| 3,349,408 | 10/1967 | Gillen et al. | 346/135.1 X |

*Primary Examiner*—Thomas J. Herbert, Jr.

*Attorney, Agent, or Firm*—Hill, Van Santen, Steadman, Chiara & Simpson

[57] ABSTRACT

A supporting structure for a decalcomania wherein the decalcomania is inserted into an aqueous solution prepared by adding a reagent to water or into a quantity of mixed aqueous solution prepared by dissolving a reagent in a quantity of suitable solvent and then mixing this solution with a quantity of water and wherein a coating (6, 3A) of a water soluble separating agent is applied over the decalcomania and wherein the dissolving speed of the coat (6, 3A) is selected to be in accordance with the reaction speed of a coloration reactant or a chromogenic substance such as a dye previously added to the coating (6, 3A) of the water soluble separating agent such that a color change will be visually present when the optimum time for transfer of the decalcomania occurs.

6 Claims, 9 Drawing Figures

FIG. 5
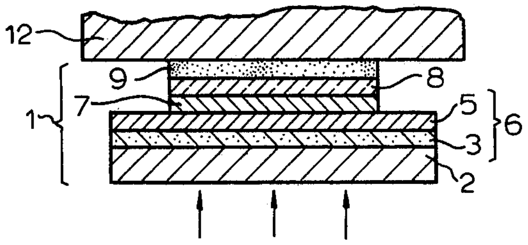
FIG. 6
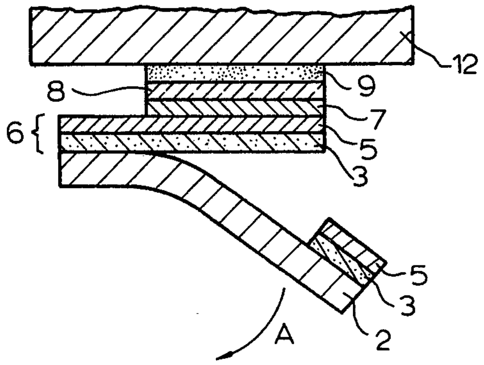
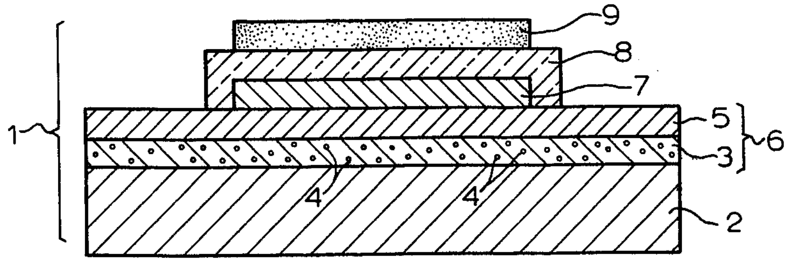
FIG. 7
FIG. 8
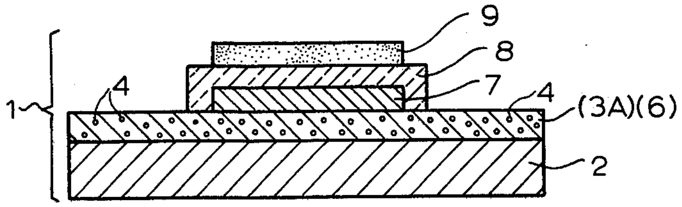
FIG. 9
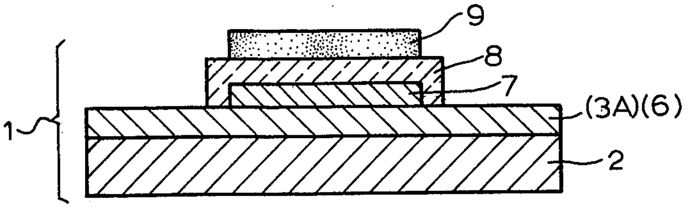

SUPPORTING STRUCTURE FOR DECALCOMANIA

BACKGROUND OF THE INVENTION

1. Field of the Invention

This invention relates in general to decalcomania and in particular to an improved decalcomania which carries a water soluble coating which allows an operator to observe when the optimum time for making the transfer of the decalcomania occurs.

2. Description of the Prior Art

Japanese patent application No. 1966—85154 (Patent Publication No. 1970—32643) assigned to the assignee of the present invention discloses decalcomania arrangements.

In the prior art, it has been necessary for the supporting structure for the decalcomania to be immersed into a quantity of a special solution consisting of water and specific organic solvent when it is desired to apply or transfer a decalcomania such as a marking comprising printed figures, patterns or letters to an object and the decalcomania is to be transferred from the supporting structure. An adhesive of the so-called solvent activated typed have been used to attach the decalcomania to the supporting structure.

The preparation of the special solution is costly and requires intricate labor and thus has substantially increased the cost of transferring decalcomanias.

Another inconvenience of the prior art is that the user often has had to rely upon imported specific organic solvents for the preparation of the special solution and consequently such solutions are often not readily available and are costly.

With the supporting structure of the prior art, the transfer of the decalcomania operation has largely depended on the length of time during which the supporting structure is maintained immersed in the special solution and, for example, transfer or application of the decalcomania is almost impossible when the time of immersion is relatively short since a coat of water soluble separating agent will not be sufficiently dissolved and the layer of adhesive will not be sufficiently activated. At the same time, longer times of immersions have resulted in the danger that the layers of the printed ink adhesive and the other substances might flow out into the special solution.

Thus, the time during which the supporting structure is left immersed in the special solution is an important factor in transfer or application of decalcomania from the supporting structure to the object and this time of immersion must be set depending upon the temperature of the special solution so that good results of transfer operation have been achieved only by the user who is sufficiently experienced and skillful in such operations.

SUMMARY OF THE INVENTION

The present invention relates to a supporting structure for a decalcomania including a paper sheet which serves as a base sheet of the supporting structure and which contains a coat of water soluble separating agent so that the speed at which the coat of water soluble separating agent will be dissolved in water when the paper sheet is permeated by water as the supporting structure is immersed into a quantity of aqueous developing solution prepared by dissolving a reagent in a quantity of water or into a quantity of mixed aqueous solution prepared by dissolving a reagent in a quantity of suitable solvent and then mixing this solution with a quantity of water and wherein the time can be visually detected so that the optimum timing for the transfer can be obtained. The present invention further relates to a supporting structure for a decalcomania having an arrangement which is simple so that the speed at which the coat of water soluble separating agent is dissolved in water can be clearly detected merely by immersing the supporting structure into a quantity of normal water for making the transfer at an optimal timing and so that the user will be very skillful in such operations.

The present invention solves the problems of the prior art and has a first object to provide a supporting structure for decalcomanias which is improved such that a reagent may be dissolved merely in a quantity of normal water which is readily available such as drinking water and the resultant aqueous solution may be directly used to achieve application of the supporting structure to an object of the decalcomania from the supporting structure without the requirement for preparation of a special solution using specific organic solvents as has been necessary in the prior art.

A second object of the invention is to provide a supporting structure for decalcomania which is improved such that the speed at which the coat of water soluble separating agent is dissolved in the water as the supporting structure is permeated by water and this can be visually detected such that the optimum timing for operation for the decalcomania transfer occurs.

A third object of the present invention is to provide a supporting structure for decalcomania including a coloration reactant or dye which is mixed into a prime coat of water soluble separating agent.

A fourth object of the present invention is to provide a supporting structure for decalcomania which is improved so it can be easily handled not only by experienced and skilled operators but also by inexperienced and unskilled operators.

A fifth object of the present invention is to provide a supporting structure for decalcomanias having an arrangement which is simple such that the optimum timing of decalcomania transfer can be detected by either an inexperienced or an experienced operator and very skillful results will be obtained.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 5 illustrates the invention being applied to a supporting structure;

FIG. 6 illustrates the paper sheet being peeled from the decalcomania of the invention;

FIG. 7 illustrates a second embodiment of the invention;

FIG. 8 is a sectional view illustrating a third embodiment of the invention; and FIG. 9 is a sectional view illustrating a fourth embodiment of the invention.

DESCRIPTION OF THE PREFERRED EMBODIMENTS

Figure 1:
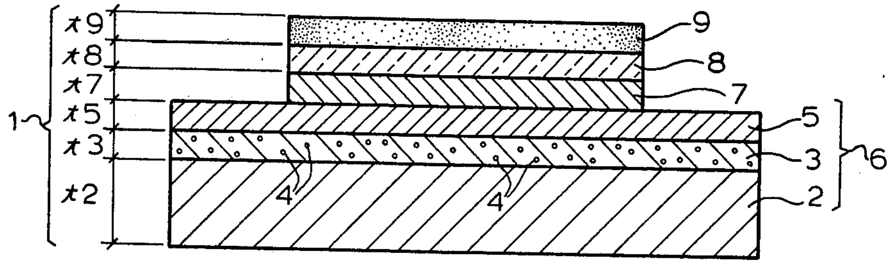
FIG. 1 is a side sectional schematic view illustrating a first embodiment of the invention.

FIG. 1 illustrates a first embodiment of the invention which illustrates a supporting structure 1 for decalcomania and which is comprised of a sheet of paper 2 that can be of any desired size and which serves as a base sheet upon which a prime coat 3 of water-soluble separating agent is applied. The prime coat 3 contains dextrine as a principle ingredient and also includes coloration reactant or chromogenic substance 4 such as dye which is mixed in the prime coat 3.

The prime coat 3 may be a water-soluble separating agent which contains in addition to dextrine as the principle ingredient and the coloration reactants or chromogenic substance 4, gum arabic and other substances adding mixing ratio as follows:

| | |
|---|---|
| Dextrine | 60 to 70% |
| Gum arabic | 35 to 20% |
| Plasticizer or like | 5 to 10% |

When polyvinylalcohol (PVA) is used, the prime coat 3 of the water-soluble separating agent may be composed of this alcohol as a simple substance.

The prime coat 3 of water-soluble separating agents is applied to the paper 2 and then dried and after it has been dried, an upper coat 5 of water-soluble separating agent which has the same composition as the prime coat 3 but which contains neither coloration reactant nor chomogenic substances 4 is applied over the prime coat 3.

The prime coat 3 of water-soluble separating agent and the upper coat 5 of water-soluble separating agent are designated in combination by 6 in FIG. 1.

It is very important to maintain a dissolution speed of the water-soluble separating agent to determine the time required for a quantity of water to react through the water-soluble separating agent coat 6 and the paper sheet 2 with the coloration reactant or chomogenic substance 4 such as dye which is mixed into the prime coat 3 of the water-soluble separating agent.

It is possible to mix the coloration reactant or chromogenic substance 4 also into the upper coat 5 of water-soluble separating agent or into the paper sheet 2 but this would sometimes result in danger that the coloration reactant or chromogenic substance would exhibit colorization or color development before the water-soluble separating agent coat 6 is dissolved in water and thus the optimum time for application of the supporting structure of the decalcomania onto an object would be incorrect since both the upper coat 5 of the water-soluble agent and the paper sheet 2 are ready for immediate contact with water.

However, it is possible to mix the coloration reactant or chromogenic substance 4 such as dye into the upper coat 5 of water-soluble separating agent or the paper sheet 2 so that the dissolution speed of the water soluble separating agent coat 6 on the one hand and the reaction rate and speed of the coloration reactant or chromogenic substance 4 such as dye on the other hand can be adjustably suppressed.

An ink layer 7 is printed in a well known manner on the dried upper coat 5 of water-soluble separating agent so as to provide suitable printing such as letters, figures, symbols, patterns, or the like or a combination of such markings. The ink forming the printed ink layer 7 may be also of the non-bridge type although in the sample embodiment bridge type ink was used.

The paper sheet 2 of any size which serves as the base sheet may comprise a sheet of water permeable paper coated with a water-soluble film layer. It is possible also, of course, to use a water permeable paper which has not been subjected to any treatment.

A transparent resin layer 8 of bridge type is applied by printing onto and in conformity with the printed ink layer 7 and layer 8 contains, for example, epoxy resin or polyurethane resin as its principle ingredient. The utilization of the layer 8 of bridge type transparent resin substantially improves the durability of the printed ink layer 7. Specifically, this layer 8 eliminates or substantially reduces trouble such as cracks, breakages, scratching, wear and tear. On the contrary, the use of a non-bridge type transparent layer and provision of a pressure sensitive adhesive layer thereon often results in various troubles.

A layer of adhesive 9 which is a pressure sensitive adhesive layer in the illustrated embodiment is applied by printing onto and in conformity with the layers 8 of the bridge type transparent resin. The pressure sensitive adhesive layer 9 contains acrylic compounds, natural rubber, synthetic rubber or the like as its principle ingredients.

The respective coatings or layers constituting the supporting structure 1 for the decalcomania as described above have the following thicknesses:

Thickness $t_2$ of the paper sheet 2 of the non-standardized size: approximately 0.1 to 0.3 mm Thickness $t_3$ of the prime coat 3 of water-soluble separating agent: approximately 0.01 to 0.02 mm Thickness $t_5$ of the upper coat 5 of water-soluble separating agent: approximately 0.01 to 0.02 mm Thickness $t_7$ of the printed ink layer 7: approximately 0.03 to 0.05 mm Thickness $t_8$ of the bridge type transparent resin layer 8: approximately 0.02 to 0.03 mm Thickness $t_9$ of the adhesive layer 9: approximately 0.02 to 0.04 mm.

Now said coloration reactants to be added to the prime coat 3 of water-soluble separating agent include substances as listed below.

TABLE 1

| Names of coloration reactants | Molecular formulae | Water solubility gr/100 gr at: 0° C. | 10° C. | 20° C. | 30° C. | 40° C. |
|---|---|---|---|---|---|---|
| Aluminum sulfate | $Al_2(SO_4)_3.18H_2O$ | 31.2 | 33.5 | 36.4 | 40.4 | 46.1 |
| Cupric chloride | $CuCl_2.2H_2O$ | 70.7 | 73.76 | 77.0 | 80.34 | 83.8 |
| Cupric nitrate | $Cu(NO_3)_2.6H_2O$ | 81.8 | 95.28 | 125.1 | — | — |
| Cupric sulfate | $CuSO_4.5H_2O$ | 14.3 | 17.4 | 20.7 | 25.0 | 28.5 |
| Nickel bromide | $NiBr_2.6H_2O$ | 112.8 | 122.2 | 130.9 | 138.1 | 144.5 |
| Nickel chloride | $NiCl_2.6H_2O$ | 53.9 | 59.5 | 64.2 | 68.9 | 73.3 |
| Nickel iodide | $NiI_2.6H_2O$ | 124.2 | 135.3 | 148.1 | 169.1 | 173.9 |

TABLE 1-continued

| Names of coloration reactants | Molecular formulae | Water solubility gr/100 gr at: | | | | |
|---|---|---|---|---|---|---|
| | | 0° C. | 10° C. | 20° C. | 30° C. | 40° C. |
| Nickel nitrate | $Ni(NO_3)_2.6H_2O$ | 79.58 | — | 96.31 | — | 122.2 |
| Nickel sulfate | $Ni(SO_4)_2.7H_2O$ | 27.22 | 32.0 | — | 42.46 | |

The substances listed below are developing reagents which may be added to a quantity of water so as to dissolve the coat 6 of water-soluble separating agent in water so that the reagents will react with the respective coloration reactants or chromogenic substance 4 to result in coloration or color development. Some combinations of the coloration reactants 4 or dyes with the corresponding reagents and the resultant coloration are listed below.

| (Coloration reactants) | (Coloration) | (Reagents) |
|---|---|---|
| Aluminum sulfate | ⟷ | Hematoxyline $C_{16}H_{14}O_6.2H_2O$ |
| Aluminum sulfate | ⟷ Mauve | Morin $C_{15}H_{10}O_7.2H_2O$ |
| Aluminum sulfate | ⟷ Green | Alizarine S |
| Cupric chloride | ⟷ Orange | Benzoinoxime $C_6H_5(NOH)—CH(OH)C_6H_5$ |
| Cupric nitrate | ⟷ Dark Green | Benzoinoxime $C_6H_5(NOH)—CH(OH)C_6H_5$ |
| Cupric sulfate | ⟷ Dark Green | Benzoinoxime $C_6H_5(NOH)—CH(OH)C_6H_5$ |
| Nickel bromide | ⟷ Dark Green | Dimethylglyoxime $CH_3.C(NOH).C(NOH).CH_3$ |
| Nickel chloride | ⟷ Red | Dimethylglyoxime $CH_3.C(NOH).C(NOH).CH_3$ |
| Nickel iodide | ⟷ Red | Dimethylglyoxime $CH_3.C(NOH).C(NOH).CH_3$ |
| Nickel nitrate | ⟷ Red | Dimethylglyoxime $CH_3.C(NOH).C(NOH).CH_3$ |
| Nickel sulfate | ⟷ Red | Dimethylglyoxime $CH_3.C(NOH).C(NOH).CH_3$ |

The above listed combinations are selected and one of the metallic salts is added to the prime coat 3 of water-soluble separating agent and the corresponding selected reagent is added to a quantity of water to obtain a quantity of aqueous developing solution 11.

When the supporting structure 1 for decalcomania of the invention is immersed into the quantity of aqueous solution 11, the coloration reactant or chromogenic substance 4 such as dye contained in the prime coat 3 of water-soluble separating agent will be colored and show color development at a predetermined speed depending on the temperature of the aqueous solution and at the same time the coat 6 of water-soluble separating agent will be dissolved in the aqueous solution 11.

The coat 6 of water-soluble separating agent has the speed of dissolution selected so that it is in accord with the reaction rate of the respective coloration reactants or chromogenic substances 4 such as dye so that a change of color occurring in the supporting structure 1 for the decalcomania can be visually observed and on this basis it will be possible to determine the time when the coat 6 of water-soluble separating agent has been dissolved in the water for the optimum transfer.

As soon as the supporting structure 1 for the decalcomania has shown the change in color, the supporting structure may be removed from the tank of aqueous solution 11 and then applied in a well known manner to an object to which the decalcomania is desired to be transferred.

EXAMPLE 1

(Experiment relating to the speed of dissolution)

This experiment indicates the time taken for dissolution of the water-soluble separating agent coat 6 in water when the supporting structure 1 for decalcomania as shown by FIG. 1 is immersed into a quantity of water, with the temperature of the water varying as follows:

| | | |
|---|---|---|
| A. | Water | 500 cc |
| | Temperature of said water | 5° C. |
| | Time required for dissolution of water-soluble separating agent coat 6 (for separation of the pattern) | 45 sec |
| B. | Water | 500 cc |
| | Temperature of said water | 10° C. |
| | Time required for dissolution of water-soluble separating agent coat 6 (for separation of the pattern) | 30 sec |
| C. | Water | 500 cc |
| | Temperature of said water | 20° C. |
| | Time required for dissolution of water- | |

-continued

| | | |
|---|---|---|
| | soluble separating agent coat 6 (for separation of the pattern) | 15 sec |
| D. | Water | 500 cc |
| | Temperature of said water | 30° C. |
| | Time required for dissolution of water-soluble separating agent coat 6 (for separation of the pattern) | 10 sec. |

EXAMPLE 2

(Experiment relating to the speed of coloration)

Figure 2:
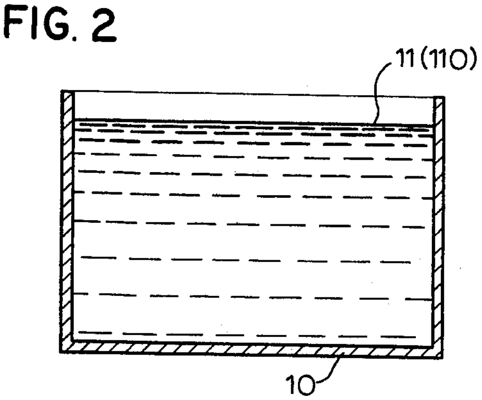
FIG. 2 illustrates a tank with a suitable bath.

Aluminum sulfate $Al_2(SO_4)_3.18H_2O$ of 5% by weight as the coloration reactant 4 was added to the prime coat 3 of water-soluble separating agent containing therein dextrine as the principle ingredient and applied over the paper sheet 2 of non-standardized size which serves as the base sheet of the supporting structure 1 for decalcomania as shown by FIG. 1, and 2.5 g of alizarine S, the reagent which reacts with said aluminum sulfate to effect coloration thereof, was dissolved into 500 cc of water to obtain a desired aqueous solution. The speed of coloration when the supporting structure 1 for decalcomania had been immersed into the aqueous solution was measured as a function of the temperature of the aqueous solution. The results were as follows:

| | | |
|---|---|---|
| A. | Water } Aqueous solution | 500 cc |
| | Alizarine S | 2.5 g |
| | Temperature of said aqueous solution | 5° C. |
| | Time required for orange coloration | 45 sec |
| B. | Water } Aqueous solution | 500 cc |
| | Alizarine S | 2.5 g |
| | Temperature of said aqueous solution | 10° C. |
| | Time required for orange coloration | 30 sec |
| C. | Water } Aqueous solution | 500 cc |
| | Alizarine S | 2.5 g |
| | Temperature of said aqueous solution | 20° C. |
| | Time required for orange coloration | 15 sec |
| D. | Water } Aqueous solution | 500 cc |
| | Alizarine S | 2.5 g |
| | Temperature of said aqueous solution | 30° C. |
| | Time required for orange coloration | 10 sec. |

It will be readily understood from Examples 1 and 2 that, when Aluminum sulfate $Al_2(SO_4)_3.18H_2O$ of 5% by weight had previously been added as the coloration reactant 4 to the prime coat 3 of water-soluble separating agent containing therein dextrine as the principle ingredient and the coat applied to the paper sheet 2 and alizarine S had previously been dissolved into a quantity of water to obtain a desired aqueous solution, the time taken for an orange coloration of the supporting structure 1 for the decalcomania immersed into the aqueous solution was the same at every temperature of the aqueous solution as the immersion time required to dissolve the coat 6 of water-soluble separating agent into water when the supporting structure 1 for decalcomania containing none of the coloration reactants had been immersed into water.

Although alizarine S, the water-soluble reagent was used in Examples 1 and 2, it is also possible to use reagents of a type which cannot be directly dissolved into water.

In such case, the non-water-soluble reagents are previously dissolved into particular solvent, i.e., a water-miscible solvent and then mixed into water to prepare a quantity of mixed aqueous solution 110. Specific examples of this will be described in the following Examples 3 and 4.

EXAMPLE 3

(Experiment concerning the speed of dissolution)

| | | |
|---|---|---|
| A. | Ethylalcohol } Mixed aqueous solution | 30 cc |
| | Water | 500 cc |
| | Temperature of said mixed aqueous solution | 5° C. |
| | Time required for dissolution of the water-soluble separating agent coat 6 | 45 sec |
| B. | Ethylalcohol } Mixed aqueous solution | 30 cc |
| | Water | 500 cc |
| | Temperature of said mixed aqueous solution | 10° C. |
| | Time required for dissolution of the water-soluble separating agent coat 6 | 30 sec |
| C. | Ethylalcohol } Mixed aqueous solution | 30 cc |
| | Water | 500 cc |
| | Temperature of said mixed aqueous solution | 20° C. |
| | Time required for dissolution of the water-soluble separating agent coat 6 | 15 sec |
| D. | Ethylalcohol } Mixed aqueous solution | 30 cc |
| | Water | 500 cc |
| | Temperature of said mixed aqueous solution | 30° C. |
| | Time required for dissolution of the water-soluble separating agent coat 6 | 10 sec. |

Nickel nitrate $Ni(NO_3)_2.6H_2O$ of 7.5% by weight had previously been added, as the coloration reactant 4, to the prime coat 3 of water-soluble separating agent containing therein dextrine as its principle ingredient and put on the paper sheet which serves as the base sheet of the supporting structure 1 for decalcomania as illustrated by FIG. 1, and dimethylglyoxime, as the corresponding reagent, had been dissolved in a quantity of ethylalcohol and then a quantity of water had been added thereto to obtain a mixed aqueous solution. The supporting structure 1 for decalcomania was immersed into this mixed aqueous solution and the time required for coloration was measured as a function of the temperature of the mixed aqueous solution.

EXAMPLE 4

| | | |
|---|---|---|
| A. | Ethylalcohol | 30 cc |
| | Water | 500 cc |
| | Dimethylglyoxime | 0.5 g |
| | Temperature of said mixed aqueous solution | 5° C. |
| | Time required for red coloration | 45 sec |
| B. | Ethylalcohol | 30 cc |
| | Water | 500 cc |
| | Dimethylglyoxime | 0.5 g |
| | Temperature of said mixed aqueous solution | 10° C. |
| | Time required for red coloration | 30 sec |
| C. | Ethylalcohol | 30 cc |
| | Water | 500 cc |
| | Dimethylglyoxime | 0.5 g |
| | Temperature of said mixed aqueous solution | 20° C. |
| | Time required for red coloration | 15 sec |
| D. | Ethylalcohol | 30 cc |
| | Water | 500 cc |
| | Dimethylglyoxime | 0.5 g |
| | Temperature of said mixed aqueous solution | 30° C. |
| | Time required for red coloration | 10 sec. |

Examples 3 and 4 indicate and support that the time required to dissolve the coat 6 of water-soluble separating agent into the mixed aqueous solution is about the same as the time required for red coloration at each temperature.

Similar results were obtained when, in addition to the metallic compound and the coloration reactant, a dye had previously been added to the prime coat 3 of water-soluble separating agent and the mixed aqueous solution had been prepared as a weak acidic or weak alkaline solution.

Figure 3:
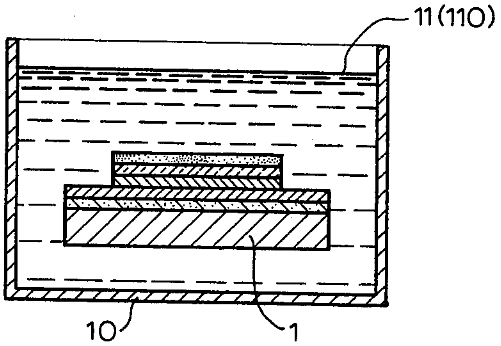
FIG. 3 illustrates the invention immersed in the tank.

In use, the decalcomania 1 illustrated in FIG. 1 is inserted into a reservoir 10 into which a suitable quantity of selected reagent is added to a quantity of water for preparation of an aqueous solution 11 or suitable quantities of ethylalcohol, a selected reagent and water are mixed together for preparation of a mixed aqueous solution 110. FIG. 3 illustrates the decalcomania 1 immersed in the reservoir bath.

FIGS. 5 and 6 illustrate an object 12 to which a decalcomania 1 is to be transferred from the supporting structure.

The quantity of aqueous solution 11 or the mixed aqueous solution 110 which has been previously placed in the reservoir 10 as shown in FIG. 2 and the decalcomania 1 is immersed into the aqueous solution 11 or the mixed aqueous solution 110 as illustrated in FIG. 3.

The coloration reactant or chromogenic substance 4 such as dye contained in the prime coat 3 of the water-soluble separating agent will exhibit coloration or color development at a predetermined speed of reaction depending on the temperature of the aqueous solution 11 or mixed aqueous solution 110 and simultaneously the coat 6 of water-soluble separating agent will progressively be dissolved in the aqueous solution or the mixed aqueous solution 110.

Figure 4:
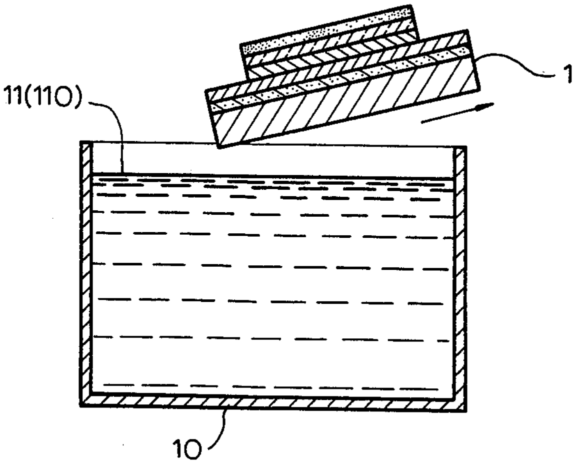
FIG. 4 illustrates the invention being removed from the tank.

When the coloration occurs in the reservoir, the supporting structure 1 for the decalcomania is withdrawn from the solution as illustrated in FIG. 4 and then is pressed against the object 12 to which the decalcomania is to be transferred as illustrated in FIG. 5.

Then the paper sheet is peeled off in the direction as indicated by the arrow A in FIG. 6 so that a part of the coat 6 of water-soluble separating agent may be peeled off integrally with the paper sheet 2 but the rest of the coat 6 remains on the printed ink layer 7 which is in turn effectively transferred to the object 12 with the bridge type transparent resin layer 8 and the adhesive layer 9. After transfer, the surface of the printed ink layer 7 may be rinsed with water to remove any residue of the coat 6 of water soluble separating agent.

FIG. 7 illustrates a second embodiment wherein the supporting structure for the decalcomania 1 has a printed ink layer 7 which has a surface coated with a bridge type transparent resin layer 8.

This arrangement allows a pressure sensitive adhesive layer 9 which is applied over the layer 8 to be prevented from protruding out of the printed ink layer 7 and thus cracking, breaking and the like of the printed ink layer 7 will be prevented.

FIG. 8 illustrates a third embodiment wherein the coating of water-soluble separating agent 6 is formed as a single coat 3A of water-soluble separating agent and the printed ink layer 7 is applied on the coat 3A of water-soluble separating agent has a surface coating and then the bridge type transparent resin layer 8 is applied over the layer 7. The adhesive layer 9 is applied over the layer 8.

Omission of the upper coating layer 5 of the water-soluble separating agent reduces the cost of preparation and the adaptation of the bridge type transparent resin layer 8 prevents cracks, breakage and the like which would otherwise often occur in the printed ink layer 7.

A fourth embodiment is illustrated in FIG. 9 wherein a low cost supporting structure 1 for the decalcomania is suitable for a user who has become skillful in handling the first, second and third embodiments and can intuitively determine the optimum timing of transfer. In this embodiment, neither coloration reactants nor chromogenic substances such as dye are used. With this embodiment, the supporting structure 1 for the decalcomania may be immersed merely into water and removed from the water after empirically determining the dissolution velocity of the single coat 3A of the water-soluble separating agent before transferring the decalcomania from the supporting structure 1 to the object.

The specific embodiment of the supporting structure 1 is as illustrated in FIG. 9 with the layers 3A, 7, 8 and 9 illustrated as above and comprising the same layers as described relative to the first three embodiments.

The supporting structure 1 for decalcomania may be immersed into a quantity of clean water until the single coat 3A of the water-soluble separating agent has been sufficiently dissolved in the water at the dissolution speed which can be empirically determined by the skillful operator and then the decalcomania can be withdrawn from the water and pressed with the adhesive layer 9 against the object 12 for making the transfer from the supporting structure to the object and then the paper sheet 2 can be peeled off. As a result, a part of the single coat 3A of water-soluble separating agent will be peeled off together with the paper sheet 2 and the rest of the decalcomania remains on the printed ink layer 7. Thus, the surface of the printed ink layer 7 may be water rinsed to remove any residue of the coat 3A which clings thereon.

This embodiment utilizes neither coloration reactant nor chromogenic substance 4 such as dye and has the advantage that the cost of preparation is correspondingly reduced.

The present invention has the advantage particularly in the embodiments 1 through 3 that a color change occurs in the supporting structure 1 which can be visually detected by the operator and therefore the optimum timing for the transfer of the decalcomania to the object 12 will be obtained and since the construction of these embodiments is based on the conception that the dissolution speed of the coat (6, 3A) of the water-soluble separating agent is similar to the reaction speed of the coloration reactant or chromogenic substance 4 such as dye and provides an advantageous cost reduction in the fourth embodiment which can be used merely with plain water when the user is experienced and skillful in decalcomania transfers.

Although the invention has been described with respect to preferred embodiments, it is not to be so limited as changes and modifications can be made which are within the full intended scope of the invention as defined by the appended claims.

I claim as my invention:

1. A supporting structure for a decalcomania adapted for use with a color developing solution of predetermined temperature comprising a supporting sheet having a coating of a water soluble separating agent thereon in which there is dispersed an inorganic color forming compound which reacts with said color developing solution to generate a color, the concentration of inorganic compound being such that said color is generated at approximately the time that said water soluble separating agent is dissolved in said color forming solution.

2. A supporting structure according to claim 1 in which said water-soluble separating agent includes dextrine.

3. A supporting structure according to claim 1 in which said surface includes a dextrine layer containing said color forming inorganic compound, and a second dextrine layer devoid of said color forming compound.

4. A supporting structure according to claim 1 wherein said inorganic color forming compound is aluminum sulfate.

5. A supporting structure for a decalcomania according to claim 1 which includes a printed ink layer over said surface, a transparent resin layer over said ink layer, and a layer of adhesive over said resin layer.

6. A supporting structure for a decalcomania according to claim 5 wherein said transparent resin layer has a surface layer area larger than the surface of the printed ink layer so as to completely surround it.

* * * * *